United States Patent
Tsuchiya et al.

(10) Patent No.: US 7,679,022 B2
(45) Date of Patent: Mar. 16, 2010

(54) VACUUM INSULATED SWITCHGEAR

(75) Inventors: Kenji Tsuchiya, Hitachi (JP); Shuichi Kikukawa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 391 days.

(21) Appl. No.: 11/624,761

(22) Filed: Jan. 19, 2007

(65) Prior Publication Data

US 2007/0175866 A1 Aug. 2, 2007

(30) Foreign Application Priority Data

Jan. 31, 2006 (JP) ............................. 2006-022532

(51) Int. Cl.
*H01H 33/66* (2006.01)

(52) U.S. Cl. .................... 218/120; 218/43; 218/140; 218/154

(58) Field of Classification Search ............... 218/2–14, 218/43–45, 118–120, 140, 153, 154
See application file for complete search history.

(56) References Cited

U.S. PATENT DOCUMENTS

| 6,188,034 B1 * | 2/2001 | Tsuzura et al. ................ 218/43 |
| 6,498,314 B2 * | 12/2002 | Miyo et al. ................ 218/118 |
| 6,518,531 B2 * | 2/2003 | Arioka et al. ............... 218/154 |
| 7,425,687 B2 * | 9/2008 | Morita et al. ............... 218/120 |
| 2002/0043516 A1 | 4/2002 | Morita et al. |

FOREIGN PATENT DOCUMENTS

| EP | 0 917 171 | 5/1999 |
| EP | 1 028 447 | 8/2000 |
| EP | 1 047 169 | 10/2000 |
| EP | 1 119 009 | 7/2001 |
| EP | 1 150 405 A2 | 10/2001 |
| JP | 2000-306474 | 11/2000 |

* cited by examiner

*Primary Examiner*—Renee S Luebke
*Assistant Examiner*—Marina Fishman
(74) *Attorney, Agent, or Firm*—Brundidge & Stanger, P.C.

(57) ABSTRACT

A vacuum insulated switchgear comprising a case having a switch section, a bus-bar section and a cable section, each being partitioned by an earthed metal plate, a vacuum double break three point switch disposed in the switch section and having breaking and disconnecting function, an operator, a bus-bar disposed in the bus-bar section of the case, and a cable connection terminal connected to a cable in the cable section.

11 Claims, 14 Drawing Sheets

VACUUM INSULATED SWITCHGEAR

CLAIM OF PRIORITY

The present application claim priority from Japanese application serial No. 2006-22532, filed on Jan. 31, 2006, the content of which is hereby incorporated by reference into this application.

FIELD OF THE INVENTION

The present invention relates to a vacuum insulated switchgear, and more particularly to a vacuum insulated switchgear suitable for electric power distribution equipments.

RELATED ART

In the electric power distribution equipments, closed type switchboxes (so called switchgears) comprising a vacuum circuit breaker for breaking load current or fault current, an earthing switch and a disconnecting switch, both for protecting safety of workers, a sensor for detecting network voltage and current and a protection relay.

In the switchgears of this type, wiring patterns of power cables for the switchgear in a site of installment has not sufficiently been considered. Thus, it has been desired that the arrangement of the switchgear is flexibly dealt with a wiring pattern. In order to solve the problem, there is a technology disclosed in patent document No. 1 wherein a plurality of switches is disposed in a molded vacuum container with terminals for connecting with outside conductors, the terminals being protruded in different directions so as to deal with the wiring pattern problem.

(Patent document No. 1) Japanese patent laid-open 2000-306474 (FIG. 31, FIG. 32)

SUMMARY OF THE INVENTION

In the switchgear mentioned above, an arrangement of the vacuum container for enclosing the plural switches in a casing with a door, bus-bars and power cables is capable of being changed in the casing in accordance with the various wiring patterns.

In the above-mentioned prior art, which deals with a wiring pattern case where the power cables are introduced upwardly of the casing and another wiring pattern case where the power cables are introduced downwardly of the casing, the switchgears are accommodated in the casing in upward and downward, opposite directions. That is, in a wiring pattern where the power cable is introduced from the lower part of the casing, a molded vacuum container wherein a plurality of switches is accommodated is arranged so that movable contacts and their operators are located above them and bus-bars to which fixed contacts are connected are located below them. On the other hand, in a wiring pattern where the power cable is introduced from the upper part of the casing, the molded vacuum container wherein a plurality of switches is accommodated is located so that the movable contacts and their operators are positioned at upper positions and the bus-bars connected to the fixed contacts are positioned at lower positions. In dealing with the wiring patterns where the power cables are introduced from the upper positions of the casing, the single vacuum container wherein a plurality of switches is accommodated is positioned so that the movable contacts and their operators are positioned at lower positions and the bus-bars are positions at upper positions.

If the wiring patterns of the power cables in installation sites are previously known, there are no problems of connection between the power cables and switchgears. However, the wiring patterns may sometimes be suddenly changed.

Accordingly, the arrangement of switchgears must be re-studied in such cases. For example, if the switchgears are constituted by reversing them up-and-down, supporting structures for the switchgears in the casing, an arrangement of the operators for the switches due to affects by gravity, etc must be investigated.

As a result, completion of installation of the switchgears would be delayed due to time lapse for the investigation. The delay of the installation may lead to power supply in the sites and productivity at the sites is retarded remarkably.

The present invention has been accomplished based on the above background. One of objects of the present invention is to provide a vacuum insulated switchgear being downsized with high reliability, which can deal with the wiring patterns of the power cables in the installation site of the switchgears with flexibility, without changing the arrangement of the switchgears.

Another object of the present invention is to provide a vacuum insulated switchgear being downsized with high reliability, which is capable of measuring electric power.

A further object of the present invention is to provide a vacuum insulated switchgear being downsized with high reliability, a case for the switchgear being not enlarged in a direction of its height at the installation sites.

In order to achieve one or more of the objects, the vacuum insulated switchgear of the present invention comprises a case constituted by a switch section, a bus-bar section, the sections being partitioned by an earthed metal plate 13, and a power cable section, a vacuum double break switch having a breaking and disconnecting function disposed to the switch section, an operator for switching the vacuum double break switch, a bus-bar disposed in the bus-bar section of the case, and a terminal introduced into the power cable section positioned at a rear side of the case, one end of the terminal being connected to the vacuum double break switch and the other end being the power cable in the cable section, wherein the power cables are arranged so that the cables are capable of being drawn out in any of an upper direction and lower direction, without changing the positions of the vacuum double break switch.

DETAILED DESCRIPTION OF THE INVENTION

In order to achieve one or more of the objects, the vacuum insulated switchgear of the present invention comprises:

a metal case having a switch section, a bus-bar section and a cable section, each being portioned by an earthed metal plate;

a vacuum double break switch having breaking and disconnecting function, which switch is disposed in the switch section of the case;

an operator for opening and closing the vacuum double break switch;

a bus-bar disposed in the bus-bar section; and a terminal introduced into the cable section, one end of which is connected to the switch and the other end is connected to the cable in the cable section, the cable being located at the rear end of the case to be connected to the cable in the cable section, and a transformer for measuring, connected to the terminal in the cable section by means of a fuse wherein the transformer is disposed below the bus-bar section of the case.

In order to achieve one or more of the objects, the vacuum insulated switchgear of the present invention comprises a case having a switch section, a bus-bar section partitioned from the switch section by an earthed metal plate and a cable section;

a vacuum double break switch disposed in the switch section of the case, having breaking and disconnecting function;

an operator for operating the switch;

a bus-bar disposed in the bus-bar section;

a terminal one end of which is connected to the switch and the other end is introduced into a position located in a rear end of the case and connected to the cable in the cable section; and a low voltage control section disposed below a front end of the case.

According to the vacuum insulated switchgear of the present invention, the vacuum double break switch being downsized with high reliability is provided wherein a circuit breaker and disconnector are unified in the case. Since the switchgear can be installed, without changing arrangement of the switchgears, with flexibility in accordance with wiring pattern of the power cables in the installation sites, the installation can be completed within a short time and power supply at the sites can be started quickly. As a result, it is possible to contribute to increasing productivity at the installation sites.

According to the vacuum insulated switchgear of the present invention, it is possible to provide a vacuum insulated switchgear being downsized with high reliability, which is capable of measuring electric power.

Further, according to the vacuum insulated switchgear of the present invention, it is possible to provide a vacuum insulated switchgear being downsized with high reliability, which is not necessary to change a size of the case in its height.

PREFERRED EMBODIMENTS OF THE INVENTION

In the following the vacuum insulated switchgear of the present invention will be explained in detail by reference to drawings.

Figure 1:
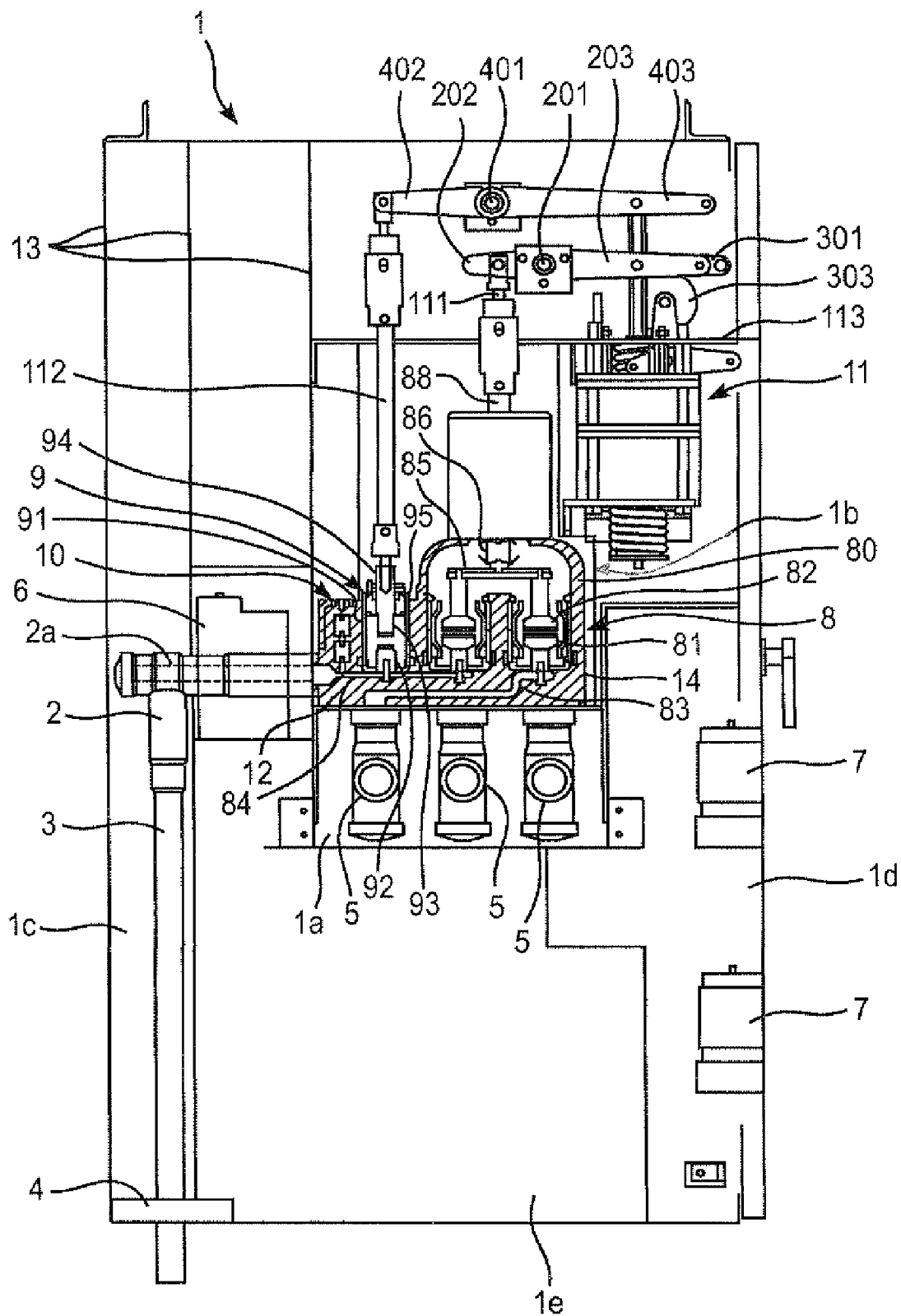
FIG. 1 is a cross sectional side view of a vacuum insulated switchgear applied to a feeder panel.
Figure 2:
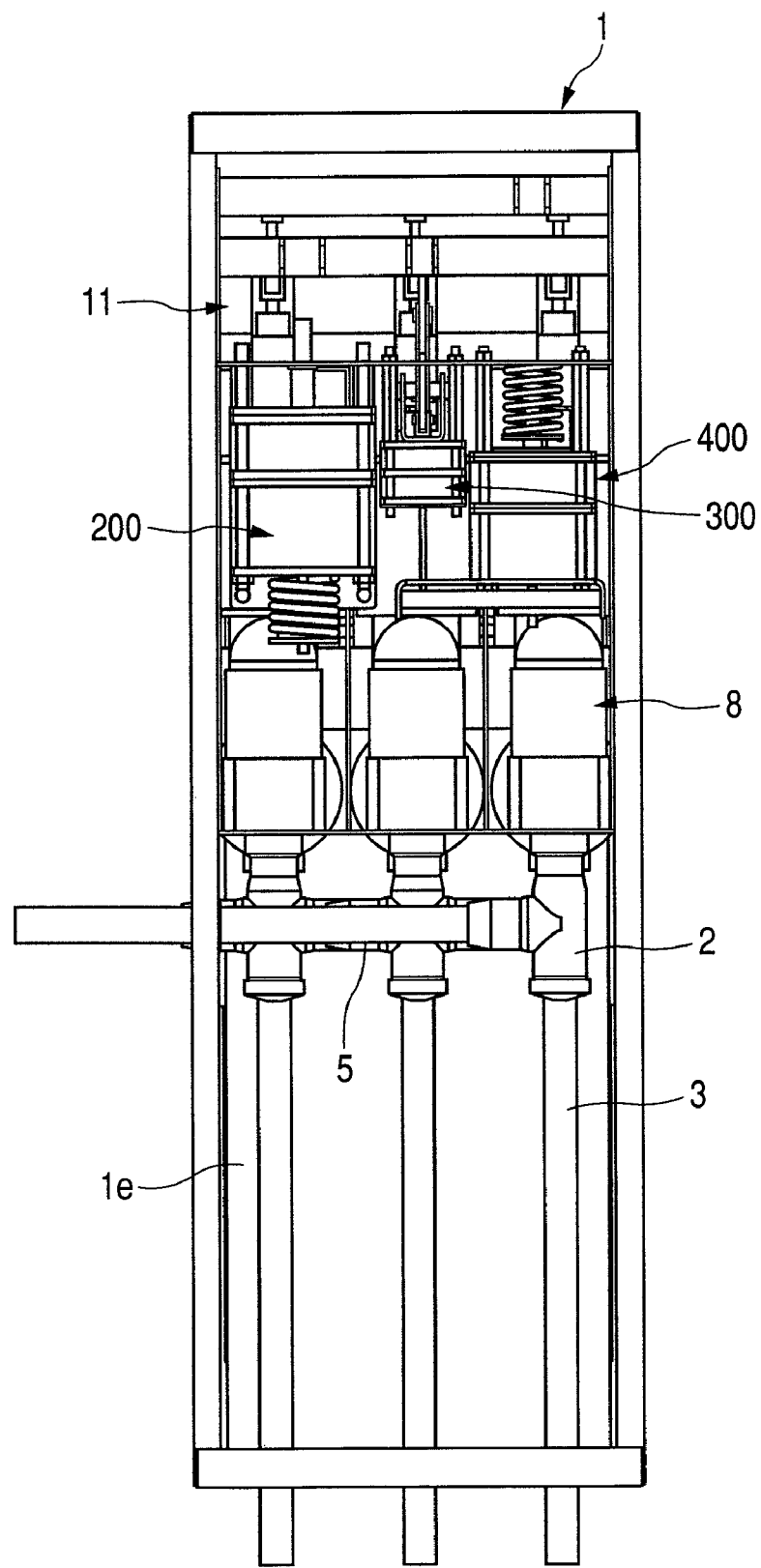
FIG. 2 is a cross sectional front view of the vacuum insulated switchgear shown in FIG. 1, applied to the feeder panel.
Figure 3:
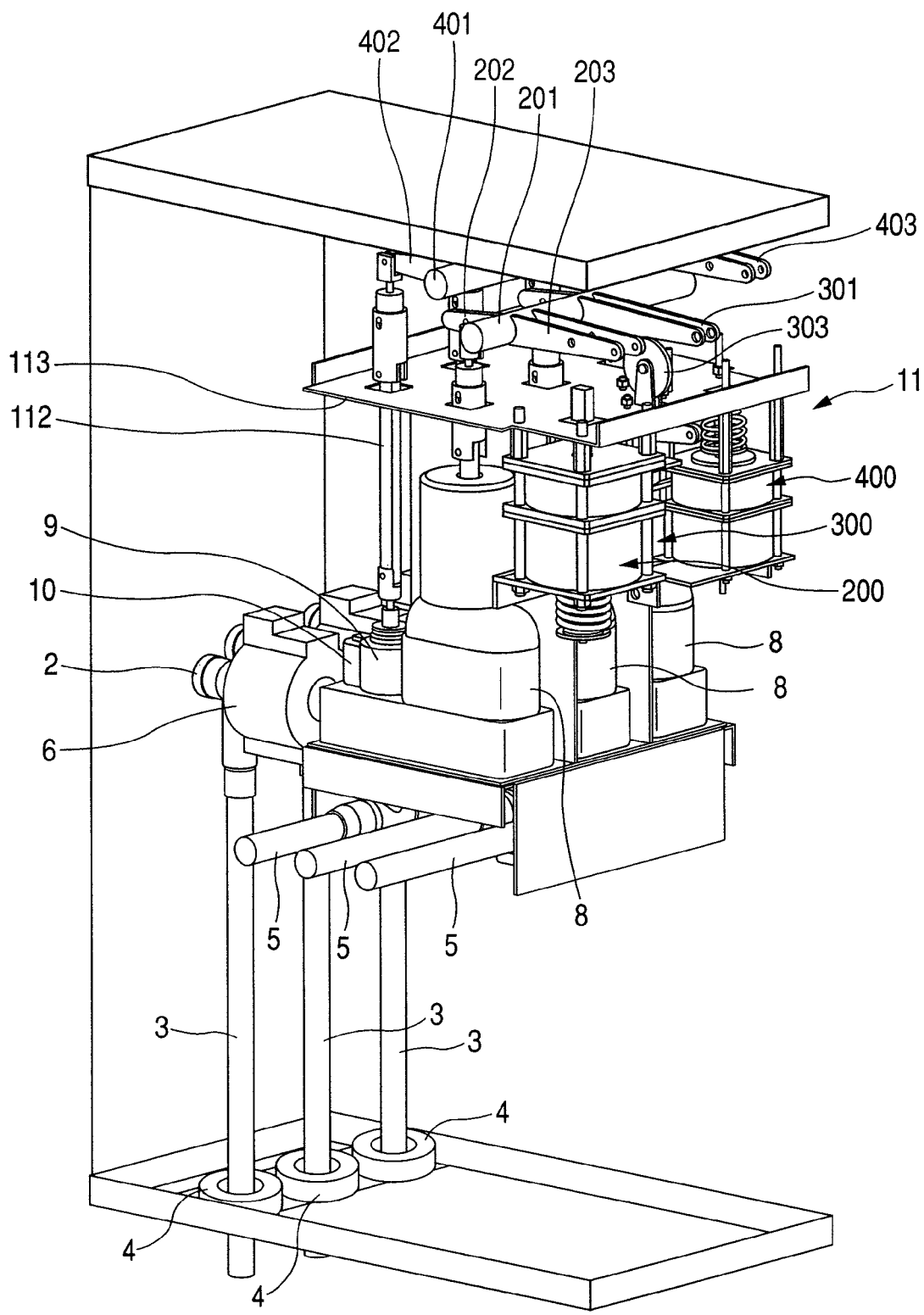
FIG. 3 is a cross sectional perspective view of the vacuum insulated switchgear shown in FIG. 1, applied to the feeder panel.

FIGS. 1 to 3 show an embodiment of the vacuum insulated switchgear applied to feeder panels. FIG. 1 is a partially broken-away cross sectional view of a side view of the switchgear; FIG. 2 is a front view of the switchgear shown in FIG. 1; and FIG. 3 is a perspective view. In these figures, case 1 of the vacuum insulated switchgear has bus-bar section 1a, switch section 1b, cable section 1c, low voltage control section 1d and a space 1e for installation of a transformer for measurement, the sections and space being partitioned with an earthed metal plate 13.

The bus-bar section 1a is positioned at the center of the case 1. The switch section 1b is positioned above the bus-bar section 1a. The cable section 1c is positioned at the rear side of the case (left side in FIG. 1). The lower voltage control section 1d is positioned at the front side of the case 1 (right side in FIG. 1). The space for the measurement is positioned below the bus-bar section 1a.

Solid-insulated bus-bars 5 for three phases are arranged in the case 1 in parallel with the front face. The bus-bars 5 are of gas-less by solid insulation so as to secure its easy handling and safety. There are arranged in the switch section 1b a vacuum double break switch 8 of three-position type (vacuum double-breaking three-position type breaking and disconnecting switch BDS), an earthing switch (ES) 9, a voltage detector (VD) 10 and an operator 11. The voltage detector 10 detects corona generated by decrease in vacuum degree in the vacuum container thereby to improve maintenance and inspection.

There are arranged in the cable section 1c the terminal 2a for connecting the cable introduced into the cable section 1c, which terminal is connected to the fixed contact of the vacuum double breaking switch 8 of 3 position type, a T-type cable head 2 disposed rotatably to the terminal 2a, a cable 3 connected to the terminal 2a by means of the T-type cable head 2, and a transformer (CT) 4 for the sensors disposed to the cable 3. The cable 3 is introduced into the cable section 1c from the lower part of the case 1.

The transformer (CT) 6 for system protection is located outside of the terminal 2a for cable connection and disposed between the cable section 1c and the switch section 1b. The low voltage control section 1d is positioned below the operator 11 in the case 1 and at the front face (right side in FIG. 1), considering that the size of the case 1 is not made high at the installation site. The low voltage control section 1d is provided with a condenser 7 for suppressing reduction in voltage due to lengthening of the cable.

Figure 4:
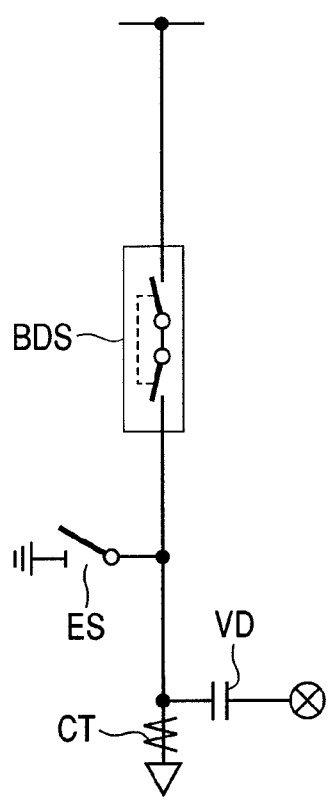
FIG. 4 is an electric circuit of the vacuum insulated switchgear shown in FIG. 1, applied to the feeder panel.

FIG. 4 shows an electric circuit of one embodiment of a feeder panel to which the vacuum insulated switchgear of the present invention is applied.

Next, the vacuum double breaking switch 8 of 3 positions type (vacuum double breaking three positions type breaking and disconnecting switch BDS), the earthing switch (ES) 9 and the voltage detector (VD) 10 disposed in the switch section 1*b* are molded integrally with epoxy resin 12 thereby to unify the switch section and downsize it. The unified switch section has a phase separation structure, which is arranged to transverse the front face of the case 1. Shielding layers are disposed between the switch sections thereby to prevent accidents of short-circuit between the phases. The outer face of the molding is a conductive paint 14 so as to earth the switch section thereby to secure safety to touching.

A detailed structure of the unified switch section will be explained by reference to FIG. 1 and FIG. 5. The vacuum double breaking switch 8 of 3 positions type (vacuum double breaking three positions type breaking and disconnecting switch BDS) comprises a vacuum container 80 having an insulating cylinder, two fixed contacts 81 and movable contacts 82, both being enclosed in the vacuum container 80 to constitute double breaking.

One of the fixed contacts 81 at right side in FIG. 1 is connected to the bus-bar 5 through the feeder 83. The other fixed contact at the left side in FIG. 1 is connected to the cable head 2 through the feeder 84.

One of the movable contacts 82 and the other movable contacts 82 are connected with each other by means of a flexible conductor 85 reinforced with metal such as stainless steel, which is not annealed at high temperature. A vacuum insulated operating rod 86 is connected to the flexible conductor 85. The vacuum insulated operating rod 86 is protruded from the vacuum container 80 through a metal bellows 87 shown in FIG. 5 and is connected to an air insulated operating rod 88. The air insulated operating rod 88 is connected to an operating rod 111 being operated by an operator 11.

Figure 5:
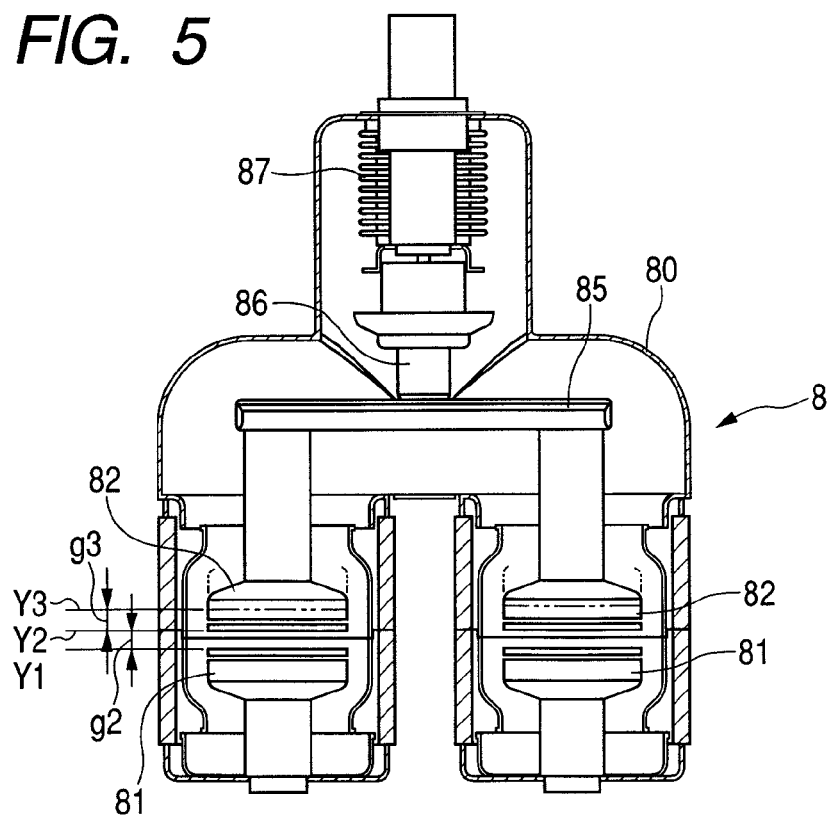
FIG. 5 is a vertical cross sectional view of a switch for the vacuum insulated switchgear shown in FIG. 1.

One of the movable contacts 82 and the other movable contacts 82 stop, as shown in FIG. 5, at a closed position Y1 for electric conduction, an open position Y2 for breaking current, and a disconnector position Y3 for securing safety to protect inspectors or repairman from a surge voltage of thunders by operation of the operating rod 111.

The above-mentioned two movable contacts 82, as shown in FIG. 5, hold a breaking gap g2 at the open position Y2 and the disconnecting gap g3 at the breaking position Y3. Further, the movable contacts keep a disconnecting gap g3 at the disconnecting position. The disconnecting gap g3 is set to be about two times the breaking gap g2 so as to keep the contact distance. If there is a plurality (in the embodiment, the number is two) of the disconnecting gaps g3 each being set to be about two times the breaking gap g2, a multistage insulation is realized.

Insulation between phases is made by solid molding insulation; insulation between the contacts is made by air insulation; and the contact distance and the number of poles are changed. According to this structure, the following relationship realizes insulation harmony.

Insulation between phases>insulation between contacts at disconnection>insulation between contacts at breaking>insulation between contacts of earth switch According to this method, an accident in the main circuit having three phases of the system is controlled to one line earthing thereby to prevent propagation of the accident.

The air insulated operating rod 88 is covered with rubber or metal bellows thereby to be isolated from atmosphere. Accordingly, the air insulated operating rod 88 maintains insulation reliability for a long service time.

As shown in FIG. 1, the earthing switch (ES) 9 comprises a vacuum container 91 with an insulating cylinder, a fixed contact 92 connected to the feeder 84 and fixed in the vacuum container 91, and a movable contact 93. The movable contact 93 is connected to the vacuum insulated operating rod 94. The vacuum insulated operating rod 94 is protruded from the vacuum container through the metal bellows 95 and is connected to an insulating operating rod 112. The above-mentioned vacuum containers 80, 91 and an operating rod are made of stainless steel to improve ecological protection. Further, the movable contact 93 is connected to a conductor (not shown).

Next, switching of the switch 8 to the closed position Y1 for conduction, the open position Y2 for breaking current and the disconnection position Y3 for securing safety of inspectors or repairmen from surge voltage due to thunders and the operator 11 that operates the earthing switch 9 will be explained in detail by reference to FIG. 6.

Constituting components for the operator 11 are fixed to a base member 113. The operator 11 comprises a first operating mechanism 200 for operating the movable contact 82 of the switch 8 to the closed position Y1 and the open position Y2, a second operating mechanism 300 for operating the movable contact 8 to the open position Y2 and the disconnecting position Y3, and a third operating mechanism for operating the movable contact 93 of the earthing switch 9.

At first, a structure of the first operating mechanism is explained by reference to FIGS. 1 and 6. In FIG. 6, the support member 113 supports a first shaft 201 so as to swing. As shown in FIG. 1, three levers 202 are fixed in the axial direction of the first shaft 201. The tip sides of the levers 202 are connected to the operating rod 111. Further, one end of the first shaft 201 lever 203 is fixed in an opposite direction with respect to the levers 2, as shown in FIGS. 1 and 6.

Figure 6:
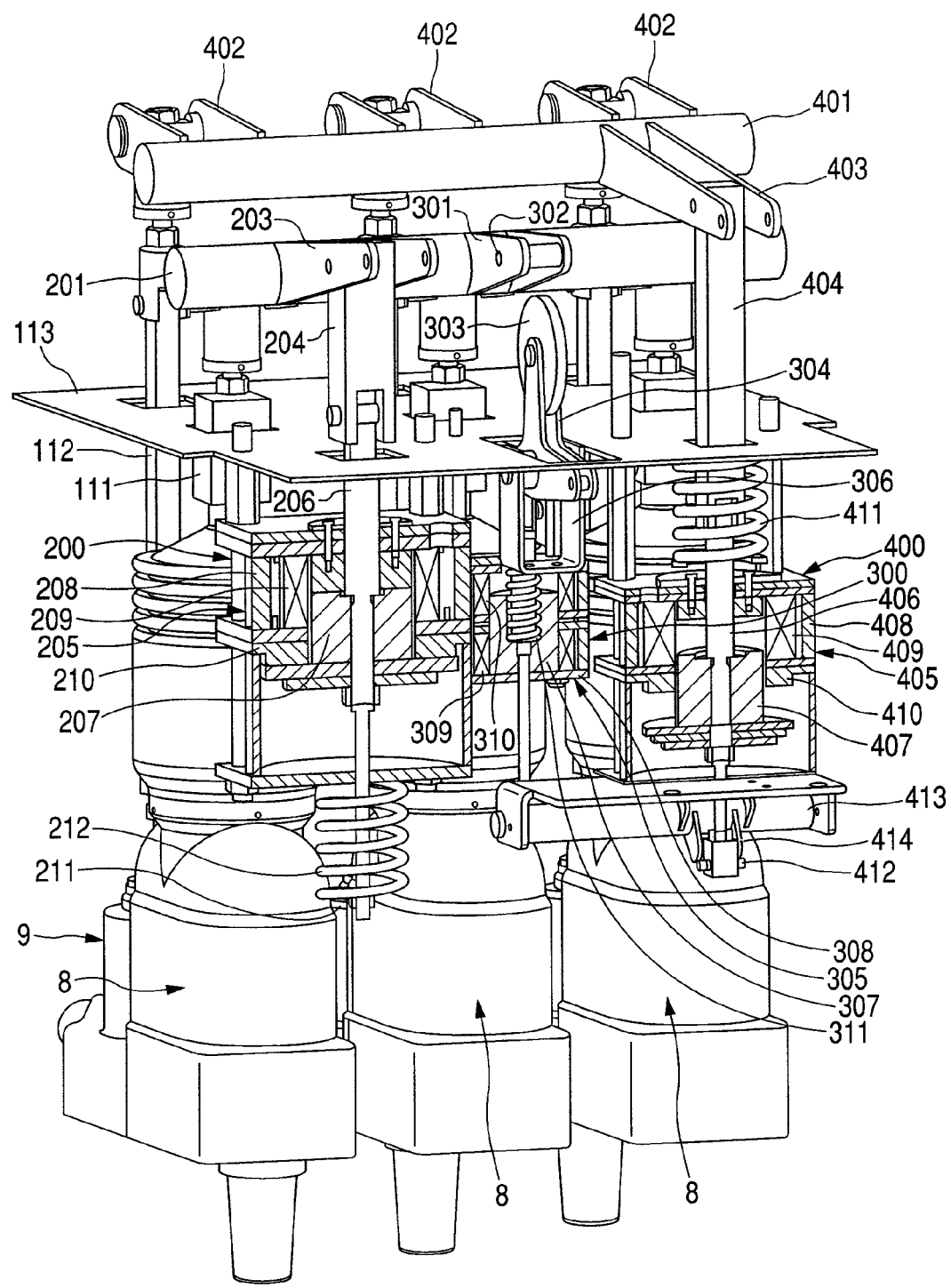
FIG. 6 is an enlarged perspective view of the switch for the vacuum insulated switchgear shown in FIG. 1.

As shown in FIG. 6, the lever 203 is connected to a driving shaft 206 of an electric magnet 205 through a connecting member 204. A movable iron core 207 with a T-shape in a sectional area is fixed to the driving shaft 206. A stator iron core 208 fixed to the support member 113 is arranged around the movable iron core 207. A coil 209 and an annular permanent magnet 210 are disposed in the stator iron core 207. A trip spring stopper 211 is disposed at the opposite side of the driving shaft 206 with respect to the lever 203. A trip spring 212 is disposed between the trip spring stopper 211 and the stator iron core 208.

The electric magnet 205 keeps a force against accumulated force of a contact spring disposed to the trip spring 212 and the air insulated operating rod 209 by virtue of attractive force between the coil 209 and the permanent magnet 210 when the movable contact 82 is held at the closed position Y1. Particularly, an attractive force of the permanent magnet 210, a so-called magnetic latch system is employed in this embodiment.

Then, a structure of the second operation mechanism 304 for switching the movable contact 82 to the open position Y2 and the disconnecting position Y3 will be explained by reference to FIG. 6. A lever 301 is fixed to a middle point in the lengthwise direction of the first shaft 201 above the support member 113. An interlock pin 302 is disposed. A roller 303 contacts with the interlock pin 302. The roller 303 is disposed rotatably at one tip side of the crank lever 304. The crank lever 304 is supported to the lower face side of the support member 113 to be able to swing.

The driving shaft 306 of the electric magnet 305 is connected to the other tip of the crank lever 304. The movable iron core 307 is fixed to the driving shaft. A stator iron core 308 is arranged around movable iron core fixed to the support member 113. Two coils 309, 310 are arranged upper side and lower side in the stator iron core 308. A return spring 311 is disposed between the movable iron core 307 and the stator iron core 308.

The above-mentioned magnets 305 drives the movable iron core 307 in upward and downward directions when the coils 309, 310 are excited. According to this movement, the crank lever 304 swings. By this swing of the crank lever 304, a contact position between the interlock pin 302 and roller 303 is changed to prevent swing of the lever 203 around the first shaft, or causes the lever 203 to swing. Thus, the movable contact 82 of the switch 8 is held to the open position Y2 because the movement of the movable contact 82 from the open position Y2 to the disconnection position Y3 is restricted and the movement from open position Y2 to the disconnection position Y3 becomes possible. That is, this structure is a first interlock mechanism between the open position Y2 and the disconnection position Y3 of the movable contact 82 of the switch 8.

A structure of a third operating mechanism 400 for operating the movable contact 93 of the earthing switch 9 is explained by reference to FIG. 6. The support member 113 supports the second shaft 401 being capable of swinging. As shown in FIG. 6, three levers 402 are fixed in the axial direction of the shaft 401. The tip sides of the levers 402 are connected to the operating rod 112. The lever 403 is fixed to the second shaft 401 in an opposite direction of the lever 402 as shown in FIG. 6.

As shown in FIG. 6, the driving shaft 406 of the electric magnet 405 is connected to the lever 403 through the connecting member 404, The electric magnet 405 has the similar structure of the electric magnet 205 of the above-mentioned first operating mechanism 200; the driving shaft 406 of the electric magnet 405 is connected to the movable iron core 407 with a T-shape. The stator iron core 408 fixed to the support member 113. A spring for breaking current is arranged around the movable iron core 407. The coil 409 and the annular permanent magnet 410 are disposed in the inside of the stator 408, A spring for breaking current is disposed between the stator iron core 408 and the lower face of the support member 113.

A second interlock mechanism is disposed between the third operating mechanism 400 of the earthing switch 9 and the second interlock mechanism for switching the movable contact 82 of the switch 8 to the open position Y2 and the disconnection position Y3.

The second interlock mechanism makes the movable contact 93 of the earthing switch 9 possible to contact with the fixed contact by the electric magnet 405 when the movable contact 82 in the switch is in the disconnection position Y3 for protecting inspectors or repairmen against-surge a surge voltage such as lightning. Further, when the movable contact 82 in the switch is in the open position Y2 for breaking current, the second interlock mechanism makes the movable contact 93 in the earthing switch 9 impossible to contact with the fixed contact. Furthermore, when the movable contact 93 is in contact with the fixed contact of the earthing switch 9, the second interlock mechanism makes the electric magnet 205 in the second operating mechanism 300 impossible to work.

For example, the second interlock mechanism comprises a pin 412 disposed to the lower end of the driving shaft 406 of the electric magnet 405 in the third operating mechanism 400, a shaft 413 disposed in parallel with the second shaft 401 to the lower end of the electric magnet 305, a lever (not shown) connected to the lower end of the driving shaft 306 of the electric magnet 305 in the second operating mechanism, and a lever 414 engaged with the pin 412, disposed to the shaft 413.

An embodiment of the vacuum insulated switchgear of the present invention, which is applied to a feeder panel will be explained by reference to FIGS. 1 to 6.

In a state where the movable contact 82 in the switch 8 is set to the open position Y2 for breaking current, the lever 203 in the first operating mechanism 200 is given a rotation force in a clockwise direction around the first shaft 201 as a fulcrum in FIG. 1, by means of the return force of the trip spring 212 in the first operating mechanism.

As a result, the pin 302 for interlock, disposed at the tip of the lever 301 constituting the second operating mechanism contacts with the top face of the outer periphery of the roller 303 and swinging of the pin 302 in the clockwise direction, which is given by the return force of the trip spring 212 is suppressed. That is, the movement of movable contact from the open position Y2 for breaking current to the disconnection position Y3 for protecting inspectors or repairmen from surge voltage such as thunders.

Next, operation (closing operation) from the open position Y2 to the closed position Y1 by means of the first operating mechanism 200 will be explained.

When current is supplied to the coil 209 of the electric magnet 205 in the first operating mechanism, the driving shaft 206 moves upward in FIG. 6. By the upward movement of the driving shaft 206, the lever 202 swings anticlockwise direction in FIG. 1 around the first shaft 201 as a fulcrum to move the movable contact 82 towards the closed position Y1. In the closed state, the trip spring 212 and contact spring are biased to prepare the opening movement.

By this closing operation, the pin 302 for interlocking remains in a position remote from the outer periphery of the roller 303. The roller 303 does not change its position by virtue of the return spring 311 in the second operating mechanism and is kept at the original position.

As has been described, if the switch 8 is in the closed state, the second operating mechanism 300 constitutes a mechanical interlock mechanism in view of needs for safety so that operation by the first operating mechanism 200 becomes impossible. That is, by the mechanical interlock, it is realized that when "the movable contact is in the closed position, disconnecting operation becomes impossible".

Next, the operation from the closed position Y1 to the open position Y2 (opening operation) by means of the first operating mechanism 200 will be explained.

The coil 209 of the electric magnet 205 in the first operating mechanism 200 is excited in a direction opposite to that of the closing operation to thereby cancel magnetic flux of the permanent magnet 210 so that the driving shaft 206 moves downward in FIG. 1 by virtue of accumulated force in the trip spring 212 and the contact spring. By this downward movement of driving shaft 206, the lever 301 swings clockwise direction in FIG. 1 by means of the first shaft 201 and lever 203; this clockwise direction swing of the lever 301 is suppressed by contacting between the pin 302 for interlocking in the second operating mechanism and the roller 303. As a result, the movable contact 82 of the switch 8 is held at the open position Y2.

Next, operation from the open position Y2 to disconnection position Y3 (disconnection operation) by the second operating mechanism will be explained.

In the open state of the switch 8, if the upper coil 309 of the electric magnet 305 is excited, the driving shaft 306 moves upward against the return spring 311. The upward movement of the driving shaft swings the roller 303 in anticlockwise direction by means of the crank lever 304. By this swing movement of the roller 303 in anticlockwise direction, a contact position between the pin 302 for interlocking and the roller 303 moves downward. As a result, the operating rod 111 moves upward by means of the lever 301, first shaft 201 and lever 202 and the movable contact 82 of the switch 8 moves to the disconnection position Y3.

In the disconnection state, the movable iron core 207 of the electric magnet 207 in the first operating mechanism 200 is present at a position lower than the permanent magnet 210. Accordingly, if the coil 209 of the electric magnet 205 in the first operating mechanism 200 is excited, there is little magnetic flux that passes through the movable iron core 207; thus attractive force is not generated. That is, it is realized that when "the movable contact is in the disconnection position, a closing operation becomes impossible".

Next, operation from the disconnection position Y3 to the open position Y2 by means of the second operating mechanism will be explained.

In the disconnection state, if the lower coil 310 of the electric magnet 205 in the second operating mechanism 300 is excited, the driving shaft 206 moves upward and the crank lever 304 swings clockwise direction so that the roller 303 pushes up the pin 304 for interlocking, which is in contact with the roller 303. As a result, the movable contact 82 of the switch 8 moves to the open position Y2.

Next, if the movable contact 82 of the switch 8 is in the open position Y2 for breaking current, the lever 414 of the second interlock mechanism engages with the pin 412 disposed at the lower end of the driving shaft 406 of the electric magnet 405 in the third operating mechanism. As a result, engagement of the fixed contact 91 with the movable contact 93 becomes impossible.

When the fixed contact 91 of the earthing switch 9 engages with the movable contact 93, the lever 414 in the second interlock mechanism engages with the pin 412 disposed at the lower end of the driving shaft. As a result, the operation by the second operating mechanism 300 is impossible. Further, when the movable contact 82 of the switch 8 is in the disconnection position Y3 for protecting inspectors or repairmen, the lever 414 in the second interlock mechanism makes possible the movement of the pin 412 disposed at the lower end of the driving shaft of the electric magnet 405. As a result, the closing of the earthing switch 9 can be performed by the third operating mechanism 400.

In the above-described embodiment, the roller 303 is used for the second\d operating mechanism 300. This roller 303 can be substituted with a cam with a partially circular form. Further, arrangement of the first operating mechanism 200 and third operating mechanism 400 may be changed appropriately. Though the electro-magnetic operation system is employed as the first operating mechanism 200, other systems such as electric driving springs, etc may be employed.

According to the above-described embodiment, when cables 3 are built in the basement of a building, the cable 3 is introduced from the lower part of the case 1 into the cable section 1c at the rear side of the case 1; the cable can be connected by the T-shape cable head 2 to the terminal 2a for connecting cables in the cable section 1 cat the rear side of the case 1. As a result, it is possible to provide a downsized, high reliability vacuum double breaking switchgear of three points type wherein the circuit breakers and disconnectors disposed in the case 1 are united, without rearranging the switches 8, etc. The switchgear can flexibly be connected and installed in dealing with cable wiring patterns at installation sites. Therefore, the installation is quickly completed thereby to start power supply and to contribute to start the production as well.

Figure 7:
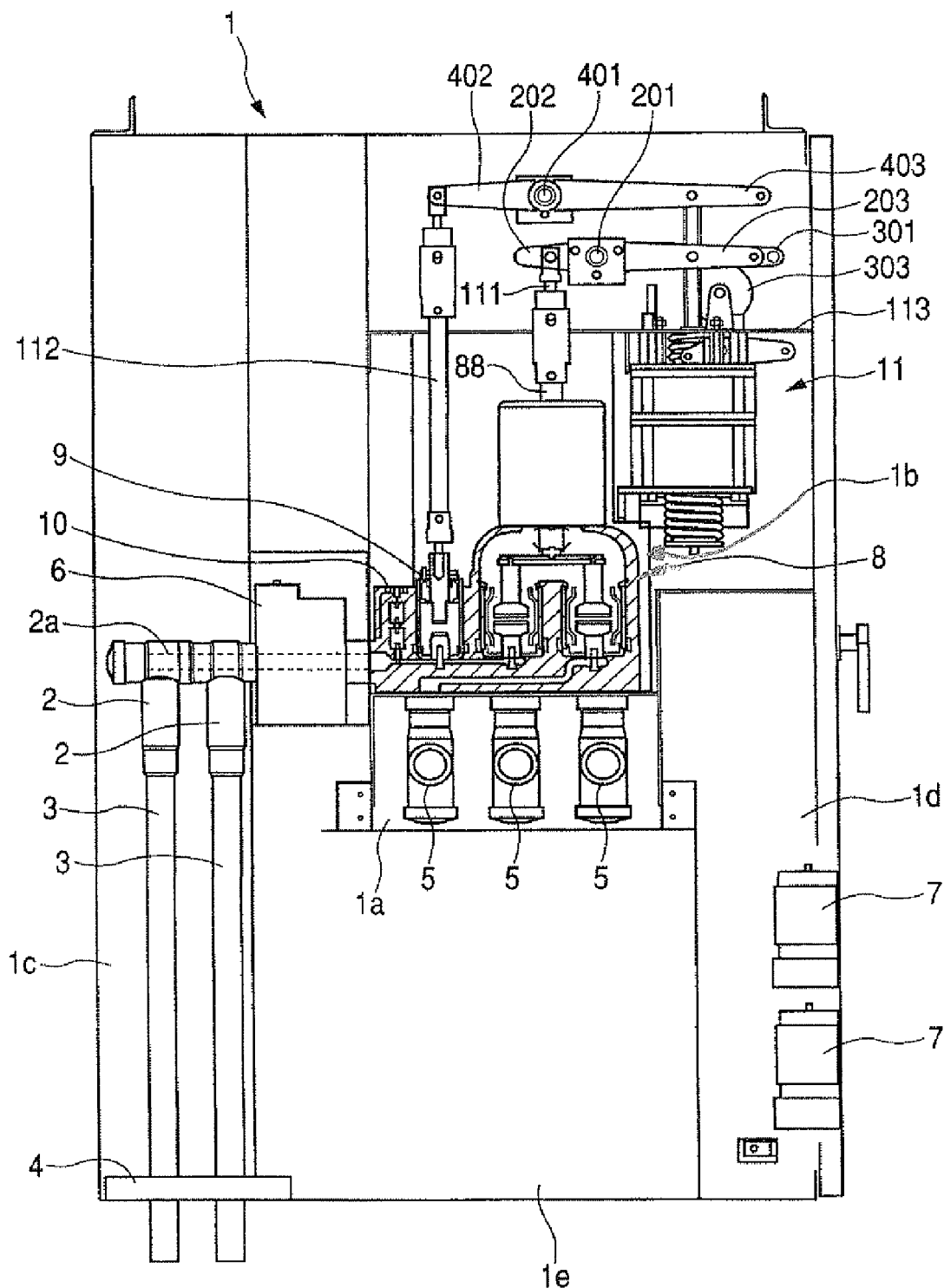
FIG. 7 is a cross sectional side view of a vacuum insulated switchgear of another embodiment applied to the feeder panel.
Figure 8:
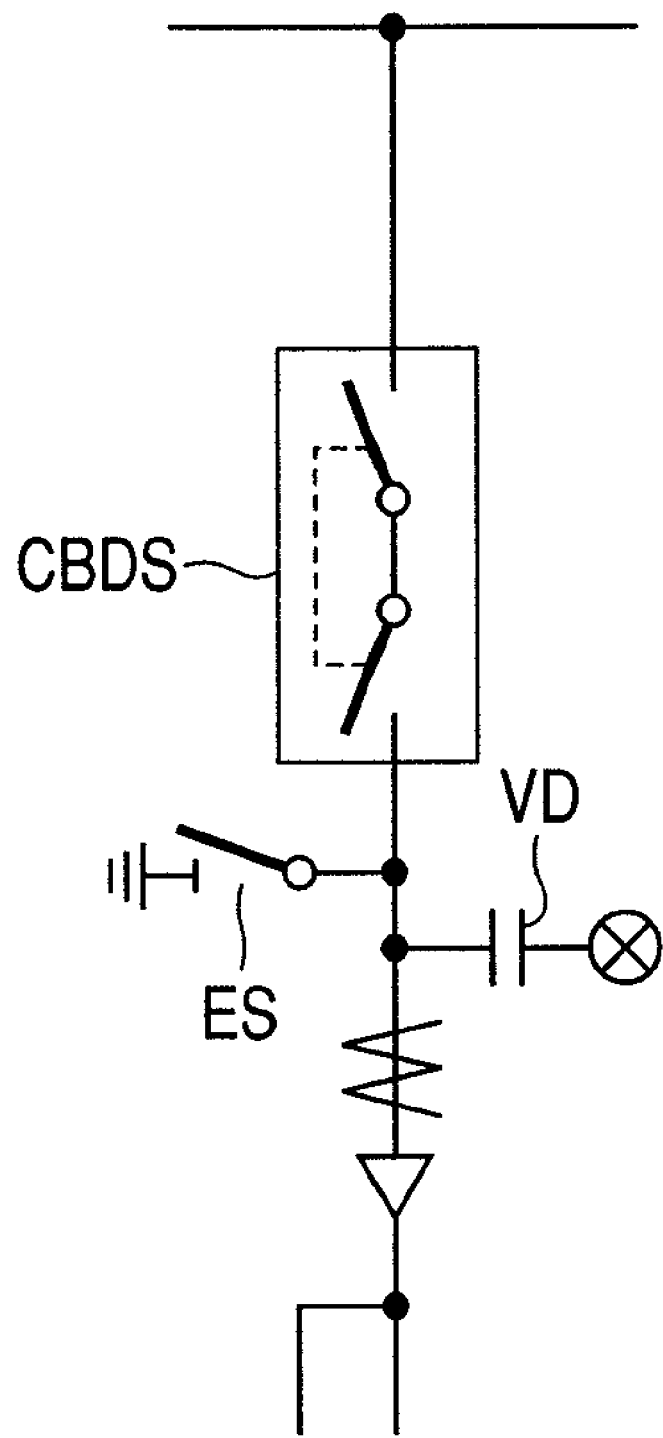
FIG. 8 is an electric circuit of the vacuum insulated switchgear shown in FIG. 7, applied to the feeder panel.

FIGS. 7 and 8 show another embodiment wherein the vacuum insulated switchgear of the present invention is applied to a feeder panel. FIG. 7 is a partially broken-away cross sectional view and FIG. 8 is an electric circuit. In these figures, the same reference numerals designate the same members or corresponding members to those in FIGS. 1 to 4; thus, detailed explanation are omitted. In this embodiment, two cables 2, which are introduced from the lower part of the case 1 into the cable section, are connected to terminals 2a for cable connection in the cable section 1c.

In this embodiment, as same as in the previous embodiments, two cables 3 are connected to the terminal for cable connection, which are introduced into the cable section 1c at the rear side of the case 1. Accordingly, it is possible to provide a downsized vacuum double breaking switchgear of three points type with high reliability wherein the circuit breakers and disconnectors in the case 1 are united without rearranging the switches 8, etc. As a result, the switchgear can flexibly be installed in dealing with wiring patterns of the cables for power transmission at the installation sites. Therefore, the installation can be quickly completed and power supply can be started within a short time thereby to contribute to the starting of production.

Figure 9:
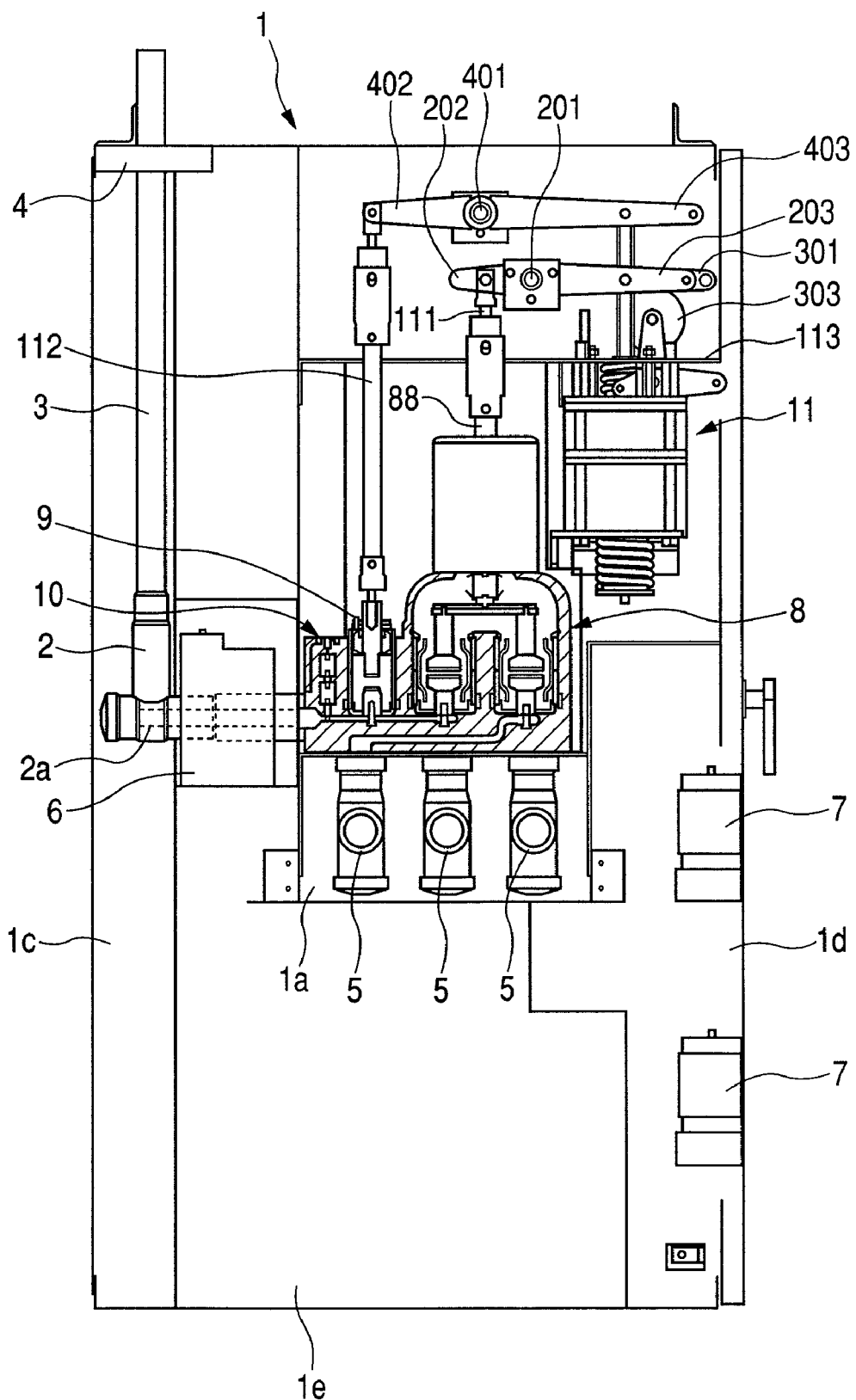
FIG. 9 is a cross sectional side view of a vacuum insulated switchgear of another embodiment, applied to a feeder panel.

FIG. 9 shows a partially cross sectional view of still another embodiment wherein the vacuum insulated switchgear is applied to a feeder panel. In this figure, the same reference numerals as those in FIGS. 1 and 2 denote the same or corresponding members; thus, the detailed descriptions are omitted. An electric circuit of the switchgear is shown in FIG. 4.

In this embodiment, the cable 3 is introduced from the upper part of the case 1 into the cable section 1c, and the cable 3 is connected to cable connection terminal 2a in the cable section 1c by means of the T-shape cable head 2.

According to this embodiment, as the same as the previous embodiment, if cables 3 are built in the ceiling, the cable 3 is introduced from the upper side into the cable section 1c at the rear side of the case 1; the cable 3 is connected by means of the T-shape cable head 2 to cable connection terminal 2a in the cable section 1c. It is possible to provide a downsized vacuum double breaking switchgear with high reliability, wherein the circuit breaker and the disconnector are unified, without rearranging the switches 8, etc. As a result, the switchgear can flexibly be installed in dealing with wiring patterns at the installation sites. Therefore, the installation can be completed quickly and can start supplying of electric power at the sites thereby to contribute to improve production.

According to this embodiment, since forming of pits for accommodating the cable in the basement of a building is not necessary, a construction cost is reduced.

Figure 10:
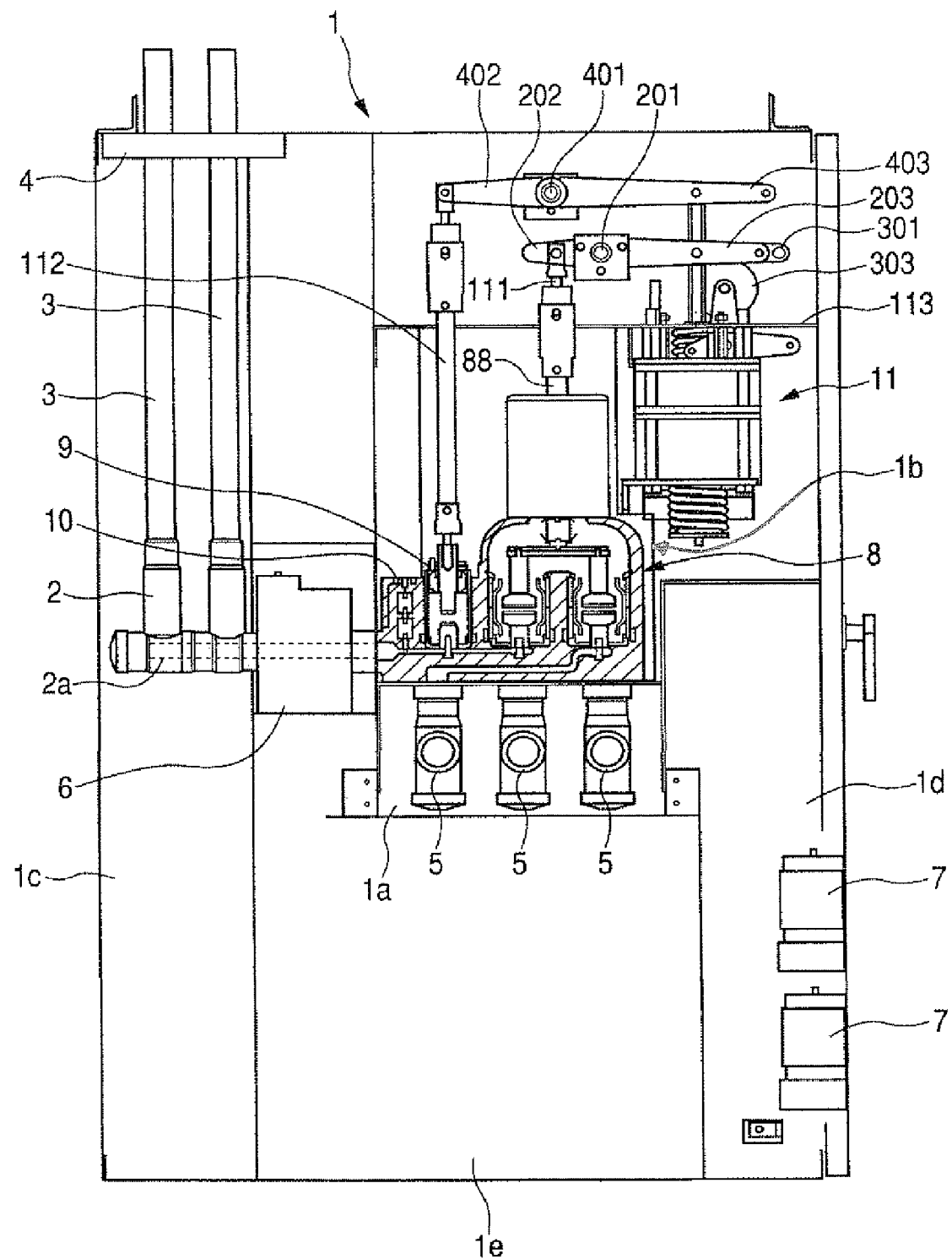
FIG. 10 is a cross sectional side view of a vacuum insulated switchgear of another embodiment, applied to a feeder panel.

FIG. 10 shows a side view of a feeder panel to which the embodiment of the present invention is applied. In this embodiment, the same reference numerals as those of FIGS. 1 and 2 denote the same or corresponding member; the detailed descriptions are omitted. FIG. 8 shows its electric circuit. In this embodiment, two cables 2, which are introduced from the upper side of the case 1 into the cable section 1c, are connected to the cable connecting terminal 2a in the cable section 1c by means of the T-shape cable head 2.

According to this embodiment, as the same as in the previous embodiment, since the two cables 3, which are introduced into the cable section 1c, are flexibly connected to the cable connecting terminal 2a, it is possible to provide a downsized vacuum double breaking three position switch with high reliability, wherein the circuit breaker and the disconnector are unified in the case 1, without rearranging the switches, etc. As a result, the switchgear can flexibly be installed within a short period of time in dealing with the wiring patterns of the power transmission cables at installation sites. Therefore, the installation is completed quickly thereby to start supply of electric power and to improve productivity at the sites.

Since it is not necessary to build pits in the basement of the building, a construction cost is reduced.

Figure 11:
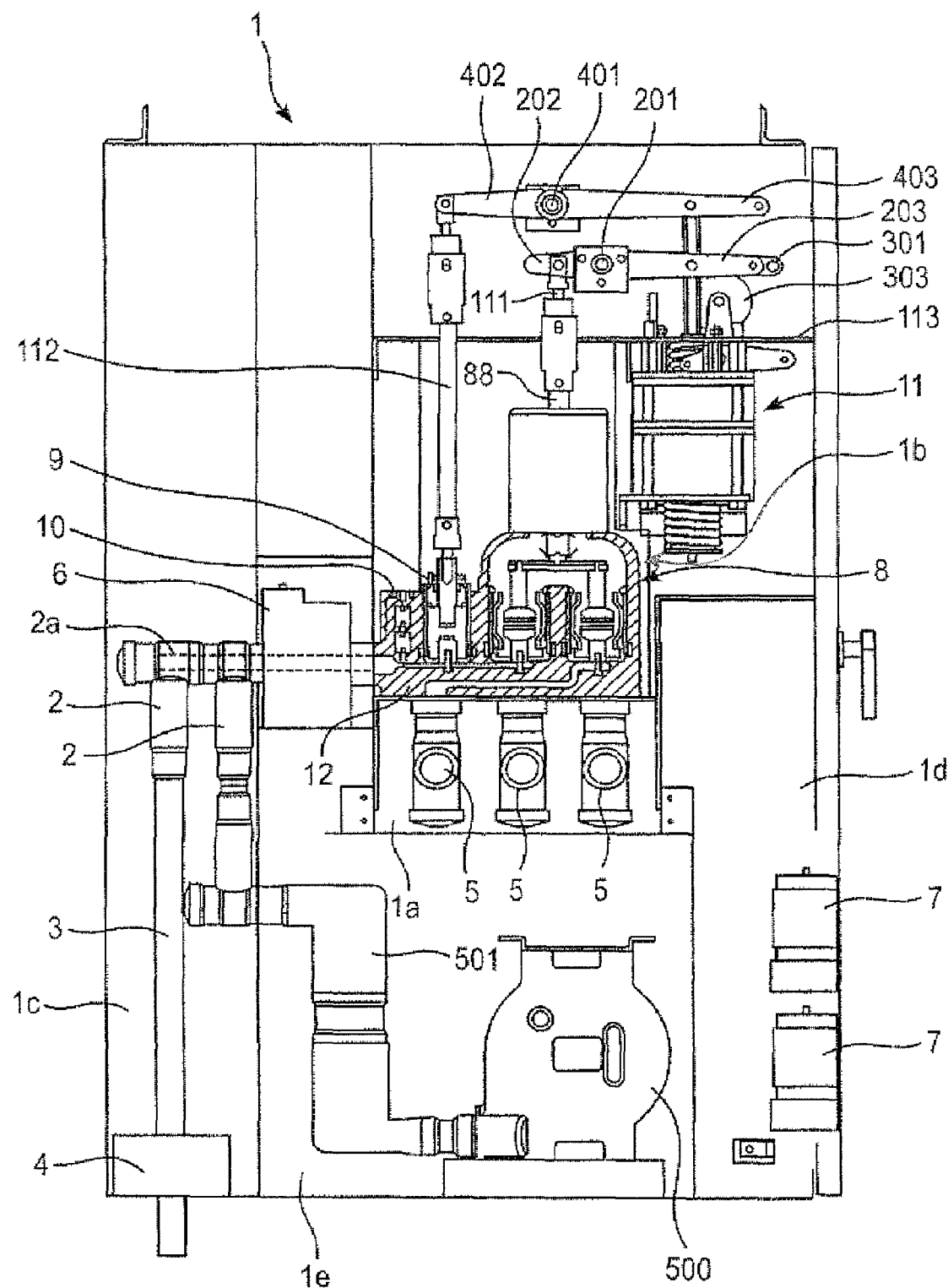
FIG. 11 is a cross sectional side view of a vacuum insulated switchgear of another embodiment, applied to a feeder meter panel.
Figure 12:
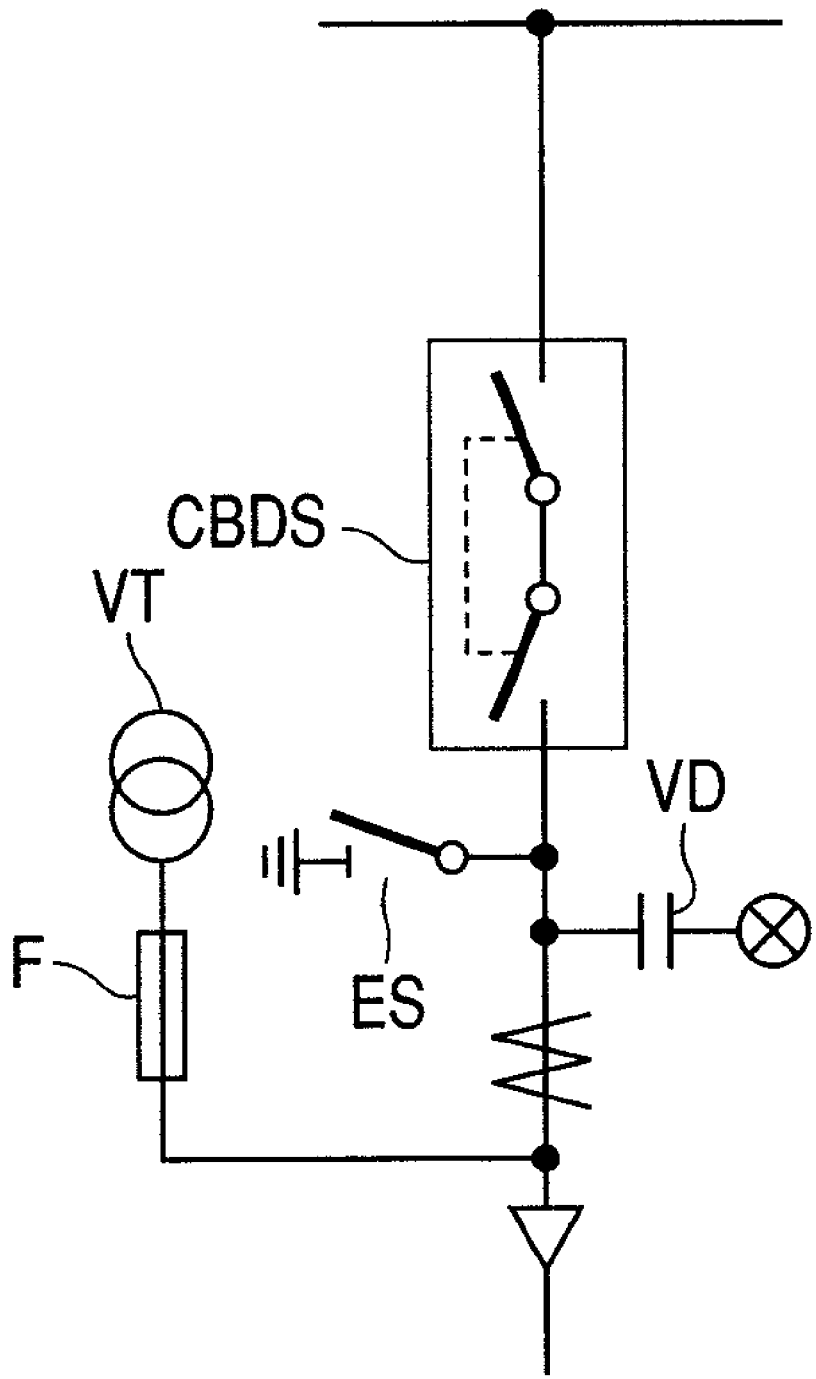
FIG. 12 is an electric circuit of the vacuum insulated switchgear shown in FIG. 11, applied to the feeder meter panel.

FIGS. 11 and 12 show a feeder panel to which the vacuum insulated switchgear according to another embodiment of the invention is applied. FIG. 11 is a side view of a feeder panel for which the vacuum insulated switchgear of the present invention is applied. FIG. 12 is its electric circuit. In these figures, the same reference numerals as those in FIGS. 1 and 2 denote the same or corresponding members.

In this embodiment, a single phase winding type measurement transformer (VT) 500 is disposed in the installation space 1e formed below the bus-bar section 1a; the transformer 500 is connected to the cable connection terminal 2a in the cable section 1c by means of a fuse 501, a terminal 16, and the T-shape cable head 2. Further, the cable connection terminal 2a is connected by means of the T-shape cable head 2 to the cable 3 introduced into the cable section 1c.

According to this embodiment, as the same as in the previous embodiment, since the cable 3 introduced into the cable section 1c from the lower part of the case 1 can be connected to the cable connection terminal introduced into the cable section 1c at the rear part of the case 1; it is possible to install a downsized vacuum double break three position switch with high reliability, without rearranging of the switches 8, etc. As a result, installation is completed within a short time to thereby start the supply of electric power at the sites and contribute to increase in productivity. Further, the measurement transformer 500 makes it possible to measure a quantity of electric power.

Figure 13:
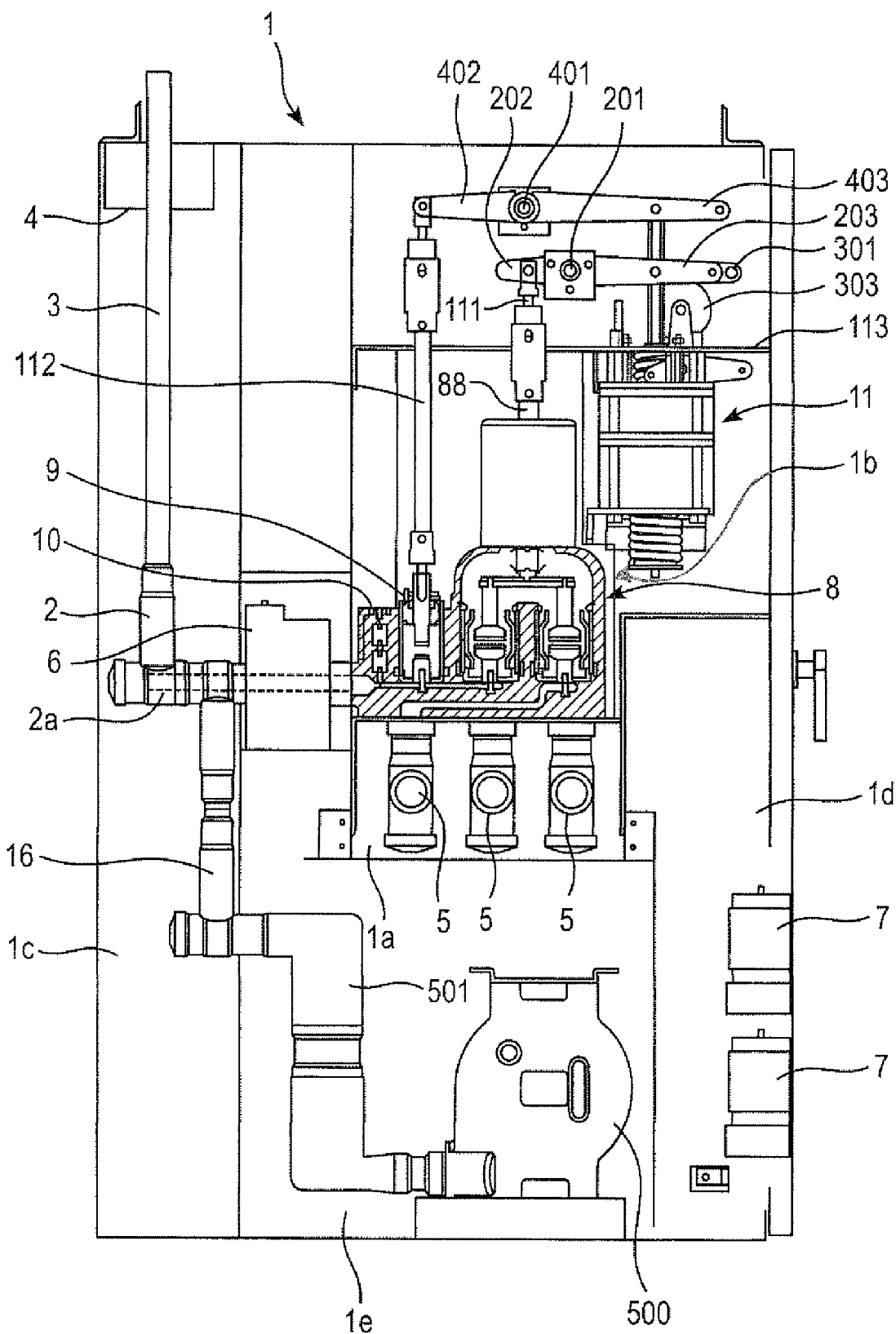
FIG. 13 is a cross sectional side view of a vacuum insulated switchgear of another embodiment, applied to a feeder meter panel.

FIG. 13 shows still another embodiment of the present invention wherein the vacuum insulated switchgear is applied to a feeder panel. An electric circuit of the embodiment is the same as in FIG. 12. In the figure, the same reference numerals as those in FIGS. 1 and 11 are the same or corresponding members.

In this embodiment, the single phase winding type measurement transformer (VT) 500 is disposed in the installation space 1e formed below the bus-bar section 1a; the transformer 500 is connected by means of the T-shape cable head 2 to the cable connection terminal 2a in the cable section 1c through a fuse (F) 501. The cable connection terminal 2a is connected by means of the T-shape cable head 2 to the cable 3 introduced from the upper part of the case 1 into the case section 2a.

According to this embodiment, as the same as in the previous embodiment, since the cable 3 introduced from the upper part of the case 1 into the cable section 1c can be connected to the cable connection terminal 2a introduced into the cable section 1c at the rear side of the case 1; it is possible to install a downsized vacuum double break three position switch with high reliability, without rearranging of the switches 8, etc. As a result, installation is completed within a short time to thereby start the supply of electric power at the sites and contribute to increase in productivity. Further, the measurement transformer 500 makes it possible to measure a quantity of electric power.

According to this embodiment, since it is not necessary to build pits for accommodating the switchgear in the basement of a building, the construction cost is reduced.

Figure 14:
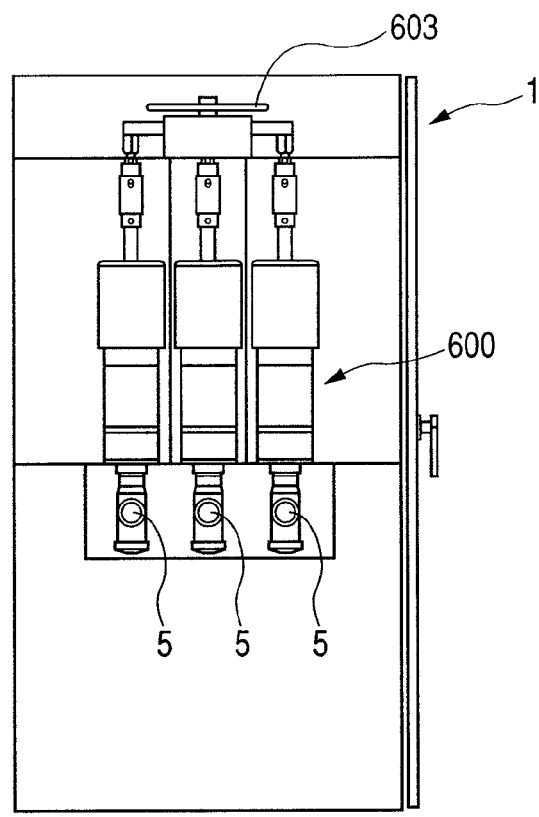
FIG. 14 is a cross sectional side view of a bus-bar separation unit that uses a vacuum insulated switchgear of the present invention, applied to building up of the feeder panel or a feeder meter panel.
Figure 15:
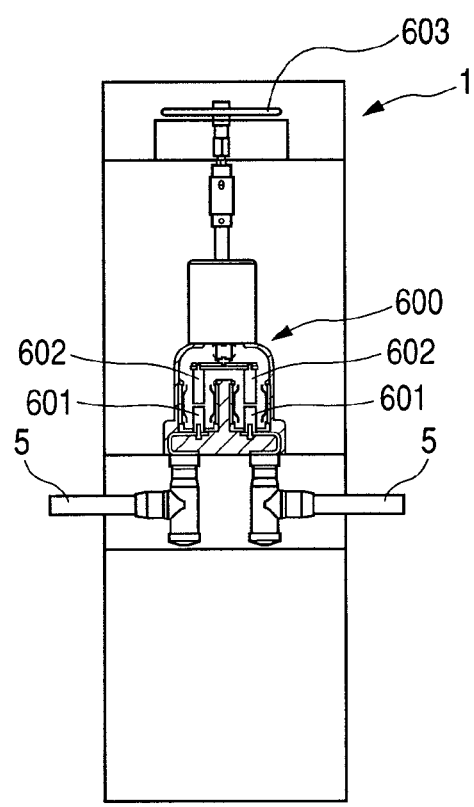
FIG. 15 is a cross sectional front view of a bus-bar separation unit that uses a vacuum insulated switchgear of the present invention, applied to building up of the feeder panel or feeder meter panel.
Figure 16:
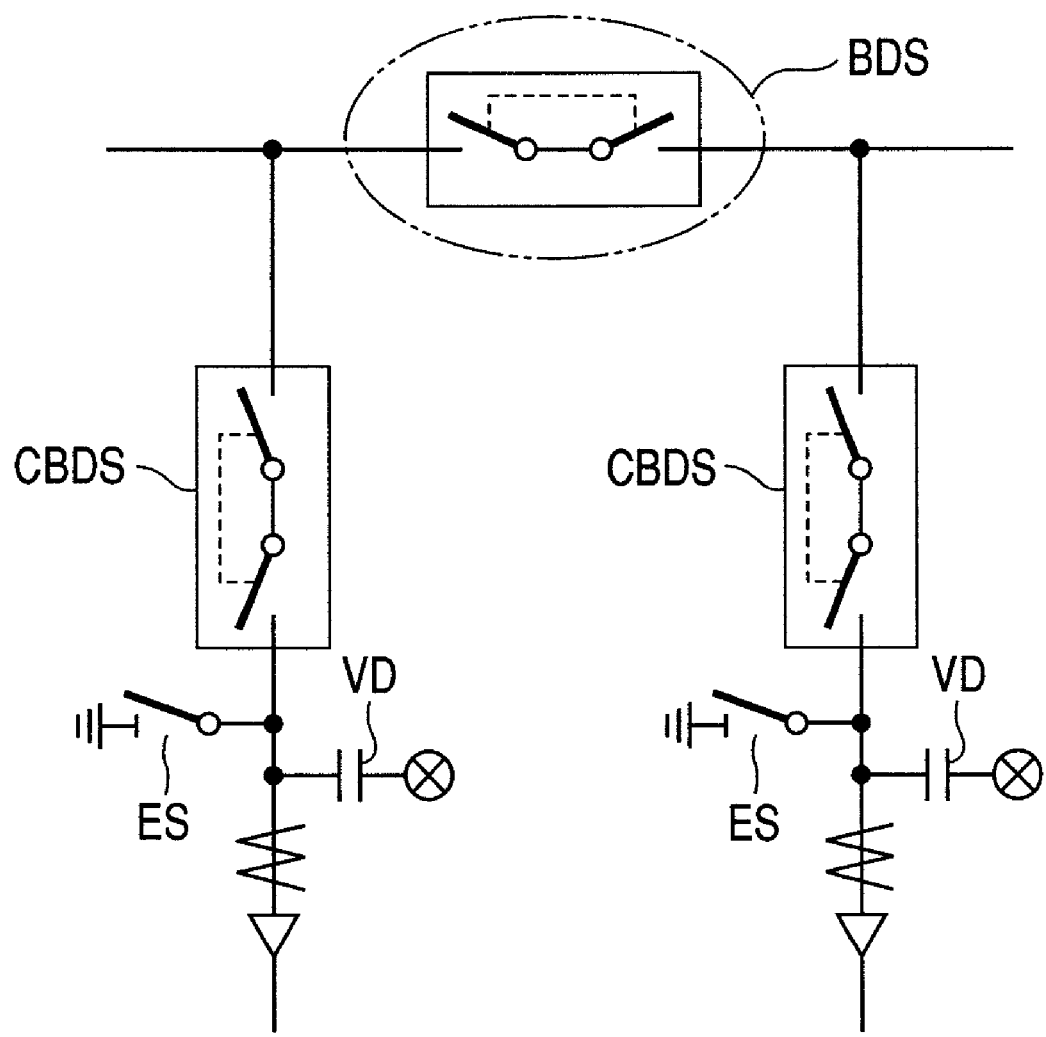
FIG. 16 is an electric circuit of a bus-bar separation unit that uses a vacuum insulated switchgear of the present invention shown in FIG. 14, applied to building up of the feeder panel or feeder meter panel.

FIGS. 14 to 16 show an embodiment of a bus-bar separation unit that use the vacuum insulated switchgear of the present invention for feeder panels and enhancement of feeder meter panels. FIG. 14 is a side view, FIG. 15 is a front view, and FIG. 16 is an electric circuit of the unit. In these figures, the same reference numerals as those in FIGS. 1 and 2 are the same or corresponding members.

In this embodiment, the vacuum double break three position switch 8 is used as a double break vacuum insulated disconnector (BDS) 600. One of the fixed contacts 601 (right side in FIG. 15) of the disconnector 600 is connected to one side of the bus-bar 5 of the feeder panel and feeder meter panel, and the other fixed contact 601 (left side in FIG. 15) of the disconnector 600 is connected to the other side of the bus-bar of the feeder panel and feeder meter panel. The movable contact 602 is separable by a handle 603 from the fixed contact 601.

According to this embodiment, if the bus-bar separable unit is previously connected to the feeder panel and the feeder meter panel, it is possible to build more the feeder panel and feeder meter panel without shut-down of the network connected to the bus-bar. Therefore, it is possible to build more them without power cut for hospitals, semiconductor manufacturing factories, etc. Thus, this system has high convenience. Since the double break disconnector is employed, reliability on disconnection is high and inexpensive.

According to the embodiments having been described, the vacuum double break three position switchgear is downsized and light-weighted because the circuit breaker and the disconnector are unified in the case. Since the power transmission cable can be connected to the cable connection terminal introduced into the cable section at the rear side of the case and the cable can be introduced from the upper and lower side of the case into the cable section, it is possible to freely deal with wiring patterns of the power transmission cables in the installation sites. As a result, the installation is completed within a short time thereby to start supply of electric power quickly and contribute to increase in productivity. Since the vacuum double break three point switch can be used as a breaking and disconnecting switch or a disconnector, it is possible to deal with customers' different needs.

According to the above-described embodiments, the vacuum double break three point switch realizes a duplication of a breaking section and disconnecting section, which has a high reliability.

According to the embodiments, because the primary circuit is a perfect phase separation structure, the inter-phase short circuit failure can be minimized. Since the switch is a double insulation structure of vacuum and molding, earthing failure due to vacuum leak is prevented. Further, insulation cooperation of the switch is set to be "phase insulation>inter-contact insulation at disconnection>inter-contact insulation at circuit break>inter-contact insulation at earth switch". Accordingly, the failure is controlled to one line circuit breakdown and propagation of the failure is suppressed as much as possible, which leads to high safety of the system.

Since the switch section is vacuum insulation, the vacuum container can be made of a thin plate and a light-weight, which leads to a downsized light-weight switch. Accordingly, transportation and installment are easy and floor weight becomes small.

In the above embodiments, though the cable 3 is introduced from the upper part or lower part of the case 1 into the cable section 1c, the cable 3 can be introduced from at least one of the part of the case 1 into the cable section 1c.

The current transformer 6 for the network protection can be omitted if necessary. In this case, the cable section 1c can be located at the rear side of the bus-bar section 1a and switch section 1b, which leads to a small depth size of the case.

What is claimed is:

1. A vacuum insulated switchgear comprising:
an earthed metal case having a low voltage control section, a switch section, a bus-bar section and a cable section, being mutually partitioned by earthed metal plates;
a vacuum double break switch having breaking and disconnecting functions, and a vacuum earthing switch connected to one fixed contact of the vacuum double break switch, wherein the vacuum double break switch and the vacuum earthing switch are disposed in the switch section of the case;
an operator for opening and closing the vacuum double break switch, connected to first and second operating mechanisms that are respectively connected to movable contacts of the vacuum double break switch and the vacuum earthing switch, wherein the operator and the first and second operating mechanisms are disposed in the low voltage control section of the case, and wherein the low voltage control section is located in a front side of the case;
a bus-bar disposed in the bus-bar section; and
a terminal introduced into the cable section, which is located at the rear end of the case and arranged to be connected to a cable in the cable section, one end of the terminal being connected to the switch and the other end arranged to be connectable to the cable in the cable section in the case and to thereby permit the cable to be connected with the terminal therein so as to extend vertically from the terminal in a space extending in the cable section and along a rear side of the case relative to the front side of the case.

2. The vacuum insulated switchgear according to claim 1, which further comprises:
a measuring voltage transformer, connected to the terminal in the cable section by means of a fuse, wherein the measuring voltage transformer is disposed inside the case.

3. The vacuum insulated switchgear according to claim 1, wherein:
the other end of the terminal is introduced into a position located in the rear side of the case and connected to the cable in the cable section.

4. The vacuum insulated switchgear according to claim 1, wherein the terminal is connected to one fixed contact of the vacuum double break switch and the bus-bar is connected to the other fixed contact of the vacuum double break switch.

5. The vacuum insulated switchgear according to claim 1, which further comprises a transformer for protecting a power transmission system, disposed between the switch section and the cable section and arranged on an outer periphery of the terminal.

6. The vacuum switchgear according to claim 1, wherein a voltage detector is disposed in the switch section, and the vacuum double break switch, the vacuum earthing switch and the voltage detector are molded integrally with resin.

7. The vacuum switchgear according to claim 1, wherein the terminal is arranged to be connectable with the cable via a cable head, the cable head being disposed rotatably to the terminal.

8. A vacuum insulated switchgear comprising:
a case having a bus-bar section located in the center of the case, a switch section next to the bus-bar section, and a cable section located and having a space extending along a rear side of the case,
a low voltage control section, located at a front side of the case relative to the rear side of the case;
two switches constituting a double break switch of three position type, disposed in the switch section, having breaking and disconnecting functions;
a vacuum insulated earthing switch disposed in the switch section, which is connected to one end of the fixed contact of one of the switches of the vacuum insulated double break switch of three position type;
first and second electromagnetic operators for operating the double break switch and the vacuum insulated earthing switch, respectively;
a terminal arranged to connect a cable introduced into the cable section located at the rear end of the case via a current transformer for a network protection and connected to the other fixed contact of the other switch of the vacuum double break switch of three position type;
a T-form cable head disposed to the terminal and selectively connectable to the cable in the cable section whether the cable is introduced upwardly or downwardly from the case; and
a condenser for electromagnetic operator disposed in the low voltage control section of the case,
wherein the terminal introduced into the cable section, which is located at the rear end of the case to the cable in the cable section, has one end thereof connected to the other fixed contact of the other switch of the vacuum double break switch, and the other end thereof arranged to be connectable to the cable in the cable section via a cable head permitting the cable to be extended vertically from the terminal in the cable section in the case.

9. The vacuum insulated switchgear according to claim 8, which further comprises a measuring voltage transformer, disposed in the space of the bus-bar section of the case and connected to the terminal for connecting the cable in the cable section.

10. The vacuum switchgear according to claim 8, wherein vacuum containers for the switches in the switch section are covered with a resin molding having a conductive coating thereon.

11. A vacuum insulated switchgear comprising:
an earthed metal case having a low voltage control section, a switch section, a bus-bar section and a cable section, each being partitioned from each other with earthed metal plates, wherein the cable section has a space extending along the rear side of the case, and vacuum containers for switches in the switch section are covered with a resin molding having a conductive coating thereon;
a vacuum double break switch comprising two switches and having breaking and disconnecting functions, and a vacuum earthing switch connected to one fixed contact of the vacuum double break switch, wherein the vacuum double break switch and the vacuum earthing switch are disposed in the switch section of the case;
an operator for opening and closing the vacuum double break switch, connected to first and second operating mechanisms that are respectively connected to movable contacts of the vacuum double break switch and the vacuum earthing switch, wherein the operator and the first and second operating mechanisms are disposed in the low voltage control section of the case, and wherein the low voltage control section is located in a front side of the case;
a bus-bar disposed in the bus-bar section; and
a terminal introduced into the cable section, which is located at the rear end of the case and arranged to be connected to the cable in the cable section, one end of the terminal being connected to a fixed contact of one of the switches of the vacuum double break switch and the other end being arranged to be connectable to the cable in the cable section in the case, via a cable head permitting the cable to be extended vertically from the terminal in the space relative to the front of the case.

* * * * *